US012581470B2

(12) United States Patent (10) Patent No.: US 12,581,470 B2
Yao et al. (45) Date of Patent: Mar. 17, 2026

(54) METHOD FOR DETERMINING TRANSMISSION FREQUENCY AND COMMUNICATION DEVICE

(71) Applicant: VIVO MOBILE COMMUNICATION CO., LTD., Dongguan (CN)

(72) Inventors: Jian Yao, Dongguan (CN); Dajie Jiang, Dongguan (CN); Rikai Cai, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 386 days.

(21) Appl. No.: 18/195,032

(22) Filed: May 9, 2023

(65) Prior Publication Data

US 2023/0319803 A1 Oct. 5, 2023

Related U.S. Application Data

(63) Continuation of application No. PCT/CN2021/138760, filed on Dec. 16, 2021.

(30) Foreign Application Priority Data

Dec. 16, 2020 (CN) .......................... 202011486710.1

(51) Int. Cl.
*H04W 72/02* (2009.01)
*H04W 72/0453* (2023.01)
*H04W 72/542* (2023.01)
(52) U.S. Cl.
CPC ....... *H04W 72/0453* (2013.01); *H04W 72/02* (2013.01); *H04W 72/542* (2023.01)

(58) Field of Classification Search
CPC .............. H04W 72/542; H04W 72/20; H04W 72/0453
See application file for complete search history.

(56) References Cited

U.S. PATENT DOCUMENTS

| | | | |
|---|---|---|---|
| 11,309,954 B2 | 4/2022 | Babich | |
| 11,323,903 B2 | 5/2022 | Berggren et al. | |
| 2013/0028128 A1 | 1/2013 | Novak et al. | |
| 2014/0056172 A1 | 2/2014 | Lee et al. | |
| 2018/0069612 A1 | 3/2018 | Yum et al. | |

(Continued)

FOREIGN PATENT DOCUMENTS

| | | |
|---|---|---|
| CN | 103002451 A | 3/2013 |
| CN | 107682879 A | 2/2018 |

(Continued)

OTHER PUBLICATIONS

Abdullah, Nor Fadzilah et al., "Millimeter Wave Performance Evaluation in Open Areas and Suburban Putrajaya", 2018 4th International Conference on Electrical, Electronics and System Engineering (ICEESE), IEEE, Nov. 8, 2018, pp. 1-5.

(Continued)

*Primary Examiner* — Kent Krueger
(74) *Attorney, Agent, or Firm* — The Webb Law Firm

(57) ABSTRACT

A method for determining a transmission frequency includes: obtaining at least one of an environmental factor or channel measurement information; and determining a first transmission frequency resource based on the at least one of the environmental factor or the channel measurement information.

17 Claims, 4 Drawing Sheets

(56) References Cited

U.S. PATENT DOCUMENTS

| | | | |
|---|---|---|---|
| 2019/0037425 A1 | 1/2019 | Hong et al. | |
| 2020/0374865 A1 | 11/2020 | Tang et al. | |
| 2021/0041292 A1* | 2/2021 | Chen | G01N 21/3581 |
| 2021/0041293 A1* | 2/2021 | Ramisetti | G01N 21/3581 |
| 2021/0041376 A1* | 2/2021 | Ashiwal | G01N 22/00 |

FOREIGN PATENT DOCUMENTS

| | | |
|---|---|---|
| CN | 109863779 A | 6/2019 |
| CN | 110636558 A | 12/2019 |
| CN | 111434053 A | 7/2020 |
| WO | 2016163819 A1 | 10/2016 |

OTHER PUBLICATIONS

Dutty, Hussnin Binte Hamid et al., "Weather Impact analysis of mmWave Channel Modeling for Aviation Backhaul Networks in 5G Communications", 2019 22nd International Conference on Computer and Information Technology (ICCIT), IEEE, Dec. 18-20, 2019, pp. 1-6.

Golovachev, Yosef et al., "Effectiveness of Various 5G Modulation Techniques in Different in Weather Conditions", 2019 IEEE International Conference on Microwaves, Antennas, Communications and Electronic Systems (COMCAS), IEEE, Nov. 4, 2019, pp. 1-3.

Matsumura. Takeshi et al., "Concept, Design, and Prototype of Shared Base Station Supporting Millimeter Waves for 5G Cellular Networks", 2017 20th International Symposium of Wireless Personal Multimedia Communications (WPMC), Dec. 17, 2017, pp. 297-303.

Tikhomirov, Andrey et al., "Experimental Study of UHF Radio Wave Propagation in Rough Terrain", 2017 IEEE Conference of Russian Young Researchers in Electrical and Electronic Engineering (EICONRUS), IEEE, Feb. 1, 2017. pp. 1293-1298.

Wang, Jun et al., "A Novel 3D Space-Time-Frequency Non-Stationary Channel Model for 6G THz Indoor Communication Systems", 2020 IEEE Wireless Communications and Networking Conference (WCNC), IEEE, May 25, 2020, pp. 1-7.

Al, Yun et al., "Radio Frequency Measurements and Capacity Analysis for Industrial Indoor Environments", 2015 9th European Conference on Antennas and Propogation (EUCAP), EURAAP, Apr. 13, 2015.

Singh, Rohit et al., "An Analytical Model for Efficient Indoor THz Access Point Deployment", 2020 IEEE Wireless Communications and Networking Conference (WCNC), IEEE, May 25, 2020.

* cited by examiner

Network side device

11

11

Terminal

Terminal

METHOD FOR DETERMINING TRANSMISSION FREQUENCY AND COMMUNICATION DEVICE

CROSS-REFERENCE TO RELATED APPLICATIONS

This application is a Bypass Continuation Application of PCT/CN2021/138760 filed Dec. 16, 2021, and claims priority to Chinese Patent Application No. 202011486710.1 filed Dec. 16, 2020, the disclosures of which are hereby incorporated by reference in their entireties.

BACKGROUND OF THE INVENTION

Field of the Invention

This application belongs to the field of communication technologies, and in particular, relates to a method and an apparatus for determining a transmission frequency, and a communication device.

Description of Related Art

Terahertz (THz) waves are defined as electromagnetic waves with frequencies ranging from 0.1 THz to 10 THz and wavelengths ranging from 3 mm to 30 μm. Bands of the electromagnetic waves are between those of millimeter waves and those of far-infrared light. There is also a definition in which electromagnetic waves with frequencies ranging from 0.3 THz to 10 THz or from 0.3 THz to 3 THz are classified as terahertz waves.

SUMMARY OF THE INVENTION

According to a first aspect, an embodiment of this application provides a method for determining a transmission frequency, performed by a first communication device and including:

obtaining at least one of an environmental factor or channel measurement information; and determining a first transmission frequency resource based on the at least one of the environmental factor or the channel measurement information.

According to a second aspect, an embodiment of this application provides an apparatus for determining a transmission frequency, including:

an obtaining module, configured to obtain at least one of an environmental factor or channel measurement information; and a determining module, configured to determine a first transmission frequency resource based on the at least one of the environmental factor or the channel measurement information.

According to a third aspect, an embodiment of this application further provides an electronic device. The electronic device includes a processor, a memory, and a program or instructions stored in the memory and executable on the processor. When the program or instructions are executed by the processor, the steps of the method according to the first aspect are implemented.

According to a fourth aspect, an embodiment of this application further provides a non-transitory computer-readable storage medium, where the non-transitory computer-readable storage medium stores a program or an instruction, and when the program or instruction is executed by a processor, the steps of the method according to the first aspect are implemented.

According to a fifth aspect, an embodiment of this application provides a chip. The chip includes a processor and a communication interface. The communication interface is coupled to the processor. The processor is configured to execute a program or instructions to implement the method according to the first aspect.

According to a sixth aspect, an embodiment of this application provides a computer program product. The computer program product is stored in a non-transient storage medium. The computer program product is executed by at least one processor to implement the steps of the method according to the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first". "second", and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, in the specification and claims, "and/or" represents at least one of connected objects, and a character "/" generally represents an "or" relationship between associated objects.

It should be noted that the technology described in the embodiments of this application is not limited to a Long Term Evolution (LTE)/LTE-advanced (LTE-A) system, and may also be used in other wireless communication systems, for example, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are usually used interchangeably. The technologies described can be applied to the above-mentioned systems and radio technologies as well as other systems and radio technologies. However, a New Radio (NR) system is described below as an example, and the term NR is used in most of the descriptions, although these technologies can also be used in an application other than an application of the NR system, for example, a sixth-generation (6G) communication system.

Figure 1:
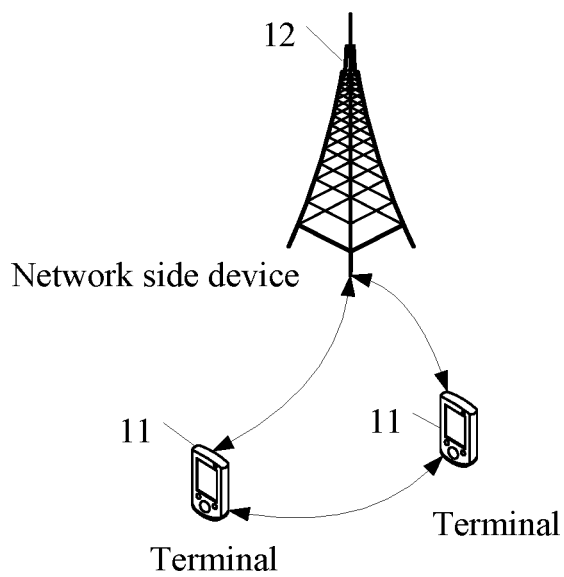
FIG. 1 is a schematic diagram of a wireless communication system.

FIG. 1 is a schematic diagram of a wireless communication system to which an embodiment of this application can be applied. The wireless communication system includes a terminal 11 and a network side device 12. The terminal 11 may also be referred to as a terminal device to user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a wristband, a headset, glasses, or the like. It should be noted that a type of the terminal 11 is not limited in the embodiments of this application. The network side device 12 may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B (eNB), a home Node B, a home evolved Node B, a wireless local area network (WLAN) access point, a wireless fidelity (WiFi) node, a transmission and reception point (TRP), or another appropriate term in the art. Provided that the same technical effects are achieved, the base station is not limited to specific technical vocabulary. It should be noted that in the embodiments of this application, a base station in the NR system is merely used as an example, but does not limit a type of the base station.

With reference to the accompanying drawings, the method for determining a transmission frequency provided in the embodiments of this application is described by using embodiments and application scenarios.

Usually, propagation loss of an electromagnetic wave in a terahertz band is greater than that of an electromagnetic wave in a low band. In addition, a terahertz wave has molecular absorption loss in the atmosphere. As a result, propagation of a terahertz wave shows frequency selectivity and has attenuation spectrum peaks in frequency domain. These attenuation spectrum peaks need to be avoided during signal transmission. As a result, in a terahertz wireless communication system, there are usually a plurality of frequency windows in signal transmission. Distribution of the formed frequency windows is affected by conditions such as a transmission distance, an air humidity/a water vapor density, an oxygen concentration, a temperature, and a barometric pressure. At present, how to determine an available transmission frequency in a terahertz band has become a problem that needs to be resolved urgently.

The method in this embodiment of this application is applied to a first communication device. The first communication device may be user equipment. The user equipment is an access terminal, a user unit, a user station, a mobile station, a mobile platform, a remote station, a remote terminal, a mobile device, a user terminal, a terminal, a wireless communication device, a user proxy, or a user apparatus. The terminal may be a cellular phone, a cordless phone, a session initiation protocol (SIP) phone, a wireless local loop (WLL) station, a PDA, a hand-held device having a wireless communication function, a computing device or another processing device connected to a wireless modem, vehicle user equipment, and a wearable device. In addition, the first communication device may alternatively be a network side device. The network side device is a base station, a core network, or the like.

Figure 2:
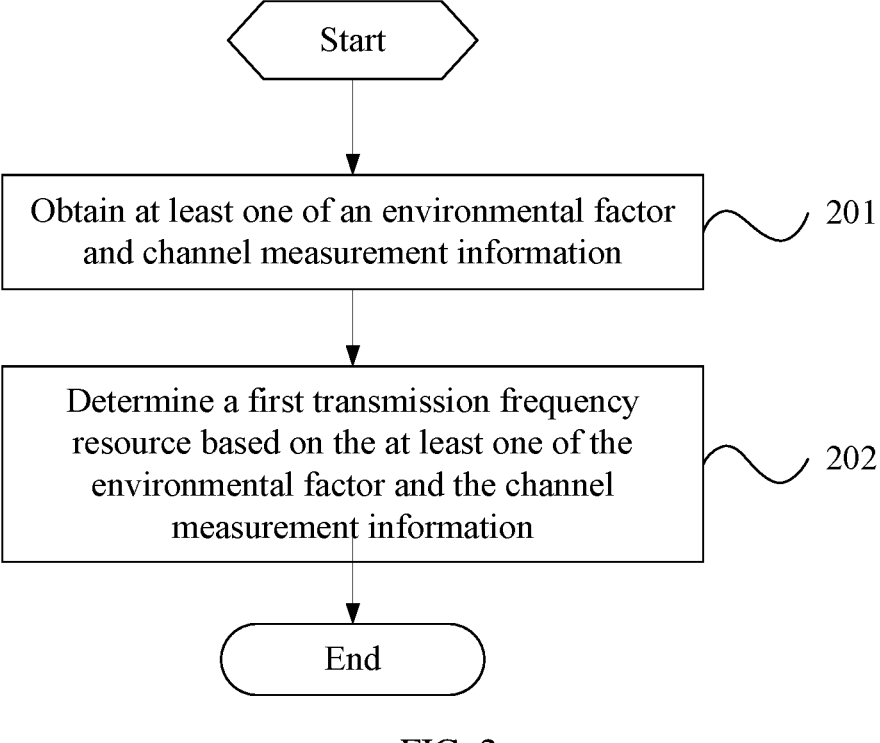
FIG. 2 is a flowchart of a method for determining a transmission frequency according to an embodiment of this application.

As shown in FIG. 2, an embodiment of this application provides a method for determining a transmission frequency, performed by a first communication device and including the following steps:

Step 201: Obtain at least one of an environmental factor or channel measurement information.

In this step, considering that transmission may be affected by an environment and/or a channel, available transmission frequency can be determined by obtaining at least one of the environmental factor or the channel measurement information. Herein, the available transmission frequency is a transmission frequency resource.

Step 202: Determine a first transmission frequency resource based on the at least one of the environmental factor or the channel measurement information.

In this step, the first transmission frequency resource can be determined based on the at least one of the environmental factor or the channel measurement information obtained in step 201, to be used for subsequent transmission.

Therefore, according to step 201 and step 202, the first communication device obtains at least one of an environmental factor or channel measurement information, and determines, based on the at least one of the environmental factor or the channel measurement information, a first transmission frequency resource used for subsequent transmission. Because the first transmission frequency resource is determined in consideration of influence of an environment and/or a channel, the first transmission frequency resource not only has availability, but also can achieve better transmission.

If the first communication device is used in a terahertz-band transmission scenario, a molecular absorption effect leads to a plurality of small frequency windows appearing in transmission of a terahertz signal. Therefore, the first transmission frequency resource determined based on the at least one of the environmental factor or the channel measurement information is a transmission frequency resource available to the first communication device in a terahertz band range.

The first transmission frequency resource may be consecutive bands, or may be non-consecutive bands.

Optionally, in this embodiment, the environmental factor includes at least one of:

a transmission distance;

an air humidity;

an oxygen concentration;

a temperature; or a barometric pressure.

Herein, the transmission distance is a transmission distance between the first communication device and the second communication device. If the first communication device is a transmit end, the second communication device is a receive end. If the second communication device is a transmit end, the first communication device is a receive end. The transmission distance may be obtained according to a positioning technology, for example, a positioning technology based on Global Navigation Satellite System (GNSS), Radio Frequency Identification (RFID), Ultra Wide Band (UWB), Bluetooth, WiFi, or a mobile network, or another related positioning technology. Alternatively, the transmission distance may be a known transmission distance, for example, a transmission distance in a fixed point-to-point communication scenario.

The air humidity, oxygen concentration, temperature, or barometric pressure may be collected by a related sensor installed in a device, or obtained via an on-line query, or obtained in another manner.

For example, the environmental factor may be measured or determined by the first communication device, or may be sent to the first communication device after being measured or determined by the second communication device.

Optionally, among environmental factors, a transmission distance and an air humidity have greater impacts on transmission than other items, thereby being used as priority items for determining a transmission frequency resource.

Optionally, in this embodiment, step 202 includes:

determining, according to a mapping relationship between frequency resources and environmental factors, a second transmission frequency resource corresponding to the environmental factor; and determining the first transmission frequency resource based on the second transmission frequency resource.

Herein, the mapping relationship between frequency resources and environmental factors is established in advance. The second transmission frequency resource corresponding to the obtained environmental factor can be determined according to the mapping relationship, thereby determining the first transmission frequency resource.

For example, the environmental factor includes the transmission distance and the air humidity. In this case, an established mapping relationship is shown in Table 1:

| Distance | Humidity | | | |
|---|---|---|---|---|
| | Resource 1 | Resource 2 | . . . | Resource m |
| Resource 1 | Frequency window set 1 | Frequency window set 2 | . . . | Frequency window set m |
| Resource 2 | Frequency window set m + 1 | Frequency window set m + 2 | . . . | Frequency window set 2m |
| . . . | . . . | . . . | . . . | . . . |
| Resource n | Frequency window set (n − 1) × m + 1 | Frequency window set (n − 1) × m + 2 | . . . | Frequency window set n × m |

In this table, the frequency resource is also represented as a frequency window set. Information about m×n frequency window sets may be determined based on transmission distances and air humidities. Each frequency window set includes at least one frequency window. For example, the information includes a quantity and numbers of frequency windows, and positions (center frequency and bandwidth), in a spectrum, of the frequency windows.

Certainly, in addition to direct mapping between a frequency resource and an environmental factor, another intermediate measure, for example, transmission loss or frequency-domain channel response amplitude, can also be used to establish a mapping relationship. For example, in a case that an environmental factor has been obtained, transmission loss or frequency-domain channel response amplitude of each frequency is calculated based on the environmental factor; and a transmission frequency resource whose transmission loss is less than a given threshold or whose frequency-domain channel response amplitude is greater than a given threshold is used as a frequency window, thereby determining a frequency window set.

Figure 3:
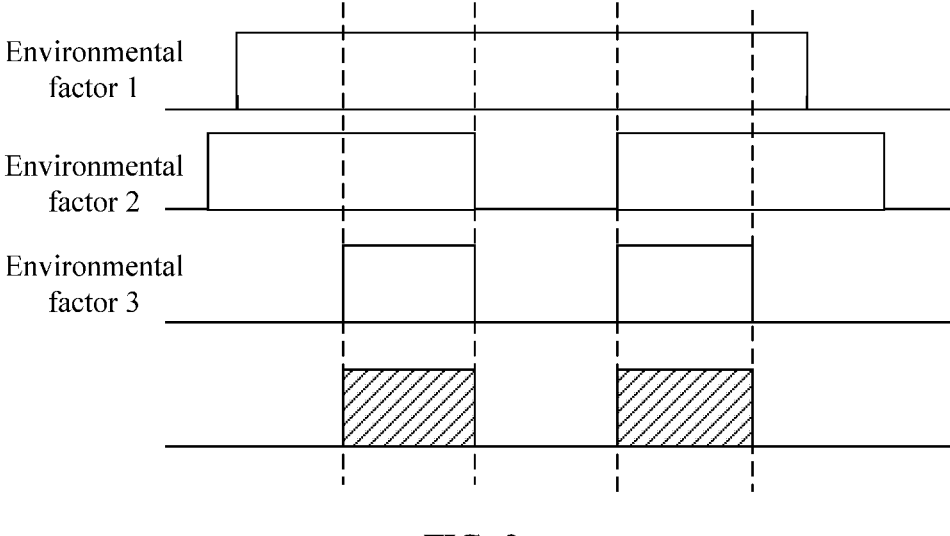
FIG. 3 is a schematic diagram of determining a frequency resource based on a plurality of environmental factors.

For a plurality of environmental factors, transmission frequency resources corresponding to the environmental factors may be independently determined first; and then, an intersection set of the transmission frequency resources may be determined. As shown in FIG. 3, transmission frequency resources shown in shaded portions are obtained after determining an intersection set of transmission frequency resources corresponding to environmental factors 1, 2, and 3.

After the second transmission frequency resource is determined, optionally, the determining the first transmission frequency resource based on the second transmission frequency resource includes:

using the second transmission frequency resource as the first transmission frequency resource.

In other words, the second transmission frequency resource determined according to the mapping relationship between frequency resources and environmental factors is the first transmission frequency resource.

Alternatively, optionally, before the determining the first transmission frequency resource based on the second transmission frequency resource, the method further includes:

obtaining a third transmission frequency resource supported by a second communication device; and the determining the first transmission frequency resource based on the second transmission frequency resource includes:

selecting an overlapped portion between the second transmission frequency resource and the third transmission frequency resource as the first transmission frequency resource.

In other words, the first transmission frequency resource is determined with reference to the second transmission frequency resource and a capability of the second communication device. For example, the capability is a capability by which the second communication device supports a terahertz band, that is, the third transmission frequency resource belongs to the terahertz band.

The obtaining a third transmission frequency resource supported by a second communication device includes:

receiving the third transmission frequency resource sent by the second communication device.

Herein, the second communication device sends the third transmission frequency resource supported by the second communication device to the first communication device; and the first communication device obtains the third transmission frequency resource via receiving. For example, the second communication device sends a terahertz band number. A center band and a frequency range that correspond to the THz band number are predefined.

In addition, for the first communication device, the second communication device is a device having a known capability, that is, the first communication device has known a transmission frequency resource supported by the second communication device. In this case, there is no need for the second communication device to report the capability. A reason why the first communication device has known the capability of the second communication device is that the second communication device has previously sent the capability.

Certainly, in this embodiment, the first communication device may alternatively use, according to a prior agreement, a preset frequency resource as a transmission frequency resource supported by the second communication device. For example, the preset frequency resource is all terahertz band resources or a specific portion of the terahertz band resources.

Optionally, in this embodiment, the determining the first transmission frequency resource based on the second transmission frequency resource includes:

selecting, from the second transmission frequency resource according to a current first transmission scheme, a first transmission frequency resource that includes a carrier corresponding to the first transmission scheme; or determining a second transmission scheme based on the second transmission frequency resource, and using, as the first transmission frequency resource, a transmission frequency resource that includes a carrier corresponding to the second transmission scheme.

In other words, the first transmission frequency resource is determined with reference to the second transmission frequency resource and the transmission scheme. Herein, the transmission scheme includes carrier aggregation-based transmission and non-carrier aggregation-based transmission. For carrier aggregation-based transmission, the available transmission frequency resource includes a plurality of carriers, where the plurality of carriers may be consecutive or non-consecutive, and may be in a same frequency window or a plurality of different frequency windows in a frequency window set. For non-carrier aggregation-based transmission, the available transmission resource includes a single carrier.

Therefore, in one aspect, the first communication device that performs transmission according to the preset first transmission scheme selects, from the second transmission frequency resource, the first transmission frequency resource that includes the carrier corresponding to the first transmission scheme. For example, the first transmission scheme is carrier aggregation-based transmission. In this case, a first transmission frequency resource including a plurality of carriers needs to be selected from the second transmission frequency resource. In another aspect, the second transmission scheme used by the first communication device for transmission is determined based on the second transmission frequency resource. In this case, the first transmission frequency resource includes the carrier corresponding to the second transmission scheme. For example, the second transmission scheme determined based on the second transmission frequency resource is non-carrier aggregation-based transmission. In this case, the first transmission frequency resource includes a single carrier.

Optionally, in this embodiment, the determining the first transmission frequency resource based on the second transmission frequency resource includes:

selecting, from the second transmission frequency resource based on the channel measurement information, a first transmission frequency resource that meets a first preset condition, where the first preset condition is that a measurement parameter belongs to a corresponding first value range.

In other words, the first transmission frequency resource is determined with reference to the second transmission frequency resource and the channel measurement information. The channel measurement information includes a measurement value of each measurement parameter. Therefore, the first transmission frequency resource is a transmission frequency resource that is selected from the second transmission frequency resource and that meets the first preset condition. In the first preset condition, the first value range corresponding to the measurement parameter is preset; and different measurement parameters have different first value ranges.

In addition, in the above content, the first transmission frequency resource may be determined based on the channel measurement information, without requiring the environmental factor. Optionally, the determining a first transmission frequency resource based on the channel measurement information includes:

selecting, based on the channel measurement information, a fourth transmission frequency resource that meets a second preset condition; and determining the first transmission frequency resource based on the fourth transmission frequency resource, where the second preset condition is that a measurement parameter belongs to a corresponding second value range.

Because the channel measurement information includes the measurement value of each measurement parameter, the fourth transmission frequency resource that meets the second preset condition is selected first herein. In the second preset condition, the second value range corresponding to the measurement parameter is also preset; and different measurement parameters have different second value ranges. However, the first transmission frequency resource is determined based on the fourth transmission frequency resource.

Herein, the channel measurement information may be obtained via measurement in which a narrow pulse signal is used as a measurement signal. Bandwidth of the narrow pulse signal covers an entire to-be-measured terahertz frequency range. A measurement result, namely, the channel measurement information, is obtained by analyzing a frequency-domain channel response in the entire to-be-measured terahertz frequency range. Alternatively, frequency-domain measurement signals that are distributed non-uniformly are used for measurement. Distribution of the frequency-domain measurement signals is determined according to a molecular absorption spectrum peak in the terahertz band, that is, denser frequency-domain measurement signals are inserted around frequencies with greater attenuation caused by an absorption effect, and sparser frequency-domain measurement signals are inserted in other positions.

In this embodiment, optionally, the channel measurement information is obtained from measurement performed by the second communication device based on a measurement signal sent by the first communication device; or the channel measurement information is obtained from measurement performed by the first communication device based on a measurement signal sent by the second communication device.

In other words, the measurement may be performed by the first communication device or the second communication device. For example, the first communication device sends, to the second communication device, a measurement signal and configuration that are associated with a currently available transmission frequency; and the second communication device performs measurement and reports a measurement result. The first communication device sends, to the second communication device, information indicating the currently available transmission frequency. The second communication device sends a measurement signal to the first communication device based on the currently available transmission frequency. The first communication device performs measurement and obtains a measurement result.

Optionally, the measurement parameter includes at least one of: frequency domain channel response amplitude, reference signal received power (RSRP) or signal to interference plus noise ratio (SINR). Certainly, the measurement parameter is not limited to the above content. Details are not listed herein.

For example, the measurement parameter is RSRP; and the second value range is greater than a specific RSRP threshold A. In a case that an RSRP value in the channel measurement information is greater than A, a transmission frequency resource corresponding to the channel measurement information is selected as the fourth transmission frequency resource. For a similar example, the measurement parameter is RSRP; and the first value range is greater than a specific RSRP threshold B. In a case that an RSRP value in the channel measurement information is greater than B, a transmission frequency resource corresponding to the channel measurement information is selected as the first transmission frequency resource from the second transmission frequency resource.

After the fourth transmission frequency resource is selected, optionally, the determining the first transmission frequency resource based on the fourth transmission frequency resource includes:

using the fourth transmission frequency resource as the first transmission frequency resource.

In other words, the fourth transmission frequency resource selected based on the channel measurement information is the first transmission frequency resource.

Alternatively, optionally, the determining the first transmission frequency resource based on the fourth transmission frequency resource includes:

selecting, from the fourth transmission frequency resource according to a current third transmission scheme, a first transmission frequency resource that includes a carrier corresponding to the third transmission scheme; or determining a fourth transmission scheme based on the fourth transmission frequency resource, and using, as the first transmission frequency resource, a transmission frequency resource that includes a carrier corresponding to the fourth transmission scheme.

In other words, the first transmission frequency resource is determined with reference to the fourth transmission frequency resource and the transmission scheme. A corresponding implementation is similar to the foregoing implementation in which the first transmission frequency resource is determined with reference to the second transmission frequency resource and the transmission scheme. Details are not described herein again.

Optionally, in this embodiment, after the determining a first transmission frequency resource, the method further includes:

performing transmission based on the first transmission frequency resource.

It can be learned from the above content that the first transmission frequency resource is a determined applicable frequency resource. Therefore, after the first transmission frequency resource is determined, the first communication device performs subsequent transmission based on the first transmission frequency resource.

To ensure communication with the second communication device, optionally, in this embodiment, after the determining a first transmission frequency resource, the method further includes:

sending transmission configuring information, where the transmission configuring information includes at least one of:

information about the first transmission frequency resource; or monitoring start indication information, where the monitoring start indication information is used to indicate that a second communication device starts monitoring on the first transmission frequency resource, and receives information from the first communication device.

In this way, after receiving the transmission configuration information, the second communication device can determine the first transmission frequency resource, start monitoring, and receive the information from the first communication device. In addition to the monitoring start indication information and/or the information about the first transmission frequency resource, the transmission configuration information may further include other related radio resource configuration information, which is not listed herein.

Certainly, the second communication device can also send information on the first transmission frequency resource; the first communication device receives the information; and the first communication device and the second communication device perform information transmission based on the first transmission frequency resource.

The information about the first transmission frequency resource included in the transmission configuration information may include at least one of a start position, an end position, a center frequency, or a band length of the resource.

It should be understood that, in this embodiment, the method further includes:

establishing a communication link to the second communication device.

A measurement signal, transmission configuration information, and the like can be transmitted only when the established communication link is used.

Optionally, the communication link may be established based on a terahertz band, a millimeter wave band, or another band.

In summary, the method in the embodiments of this application takes influence of an environment and/or a channel into consideration, and can determine an available transmission frequency resource based on at least one of a current environmental factor or channel measurement information. Particularly, for a terahertz band, a transmission frequency resource in the terahertz band can be used more reasonably. For example, guard bands of frequencies that are affected by a water molecular absorption effect may be reduced based on an environmental factor such as a distance between a transmit end and a receive end, thereby improving spectrum efficiency of a terahertz wireless communication system.

It should be noted that the method for determining a transmission frequency provided in this embodiment of this application may be performed by an apparatus for determining a transmission frequency or a control module that is in the apparatus for determining a transmission frequency and that is configured to perform the method for determining a transmission frequency. In the embodiments of this application, that the apparatus for determining a transmission frequency performs the method for determining a transmission frequency is used as an example to describe the method for determining a transmission frequency provided in the embodiments of this application.

Figure 4:
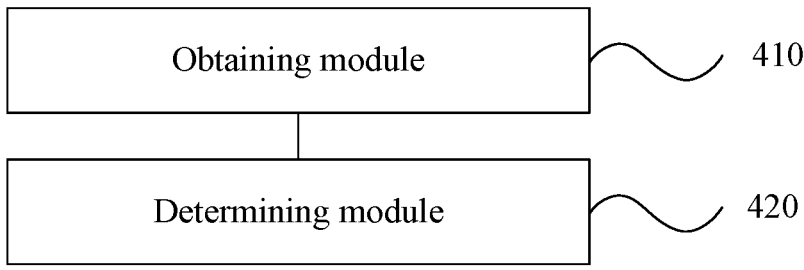
FIG. 4 is a structural diagram of an apparatus for determining a transmission frequency according to an embodiment of this application.

As shown in FIG. 4, an embodiment of this application provides an apparatus for determining a transmission frequency, including:

an obtaining module 410, configured to obtain at least one of an environmental factor or channel measurement information; and a determining module 420, configured to determine a first transmission frequency resource based on the at least one of the environmental factor or the channel measurement information.

Optionally, the environmental factor includes at least one of:

a transmission distance;

an air humidity;

an oxygen concentration;

a temperature; or a barometric pressure.

Optionally, the determining module includes:

a first determining sub-module, configured to determine, according to a mapping relationship between frequency resources and environmental factors, a second transmission frequency resource corresponding to the environmental factor; and a second determining sub-module, configured to determine the first transmission frequency resource based on the second transmission frequency resource.

Optionally, the second determining sub-module is further configured to:

use the second transmission frequency resource as the first transmission frequency resource.

Optionally, the determining module further includes:

an obtaining sub-module, configured to obtain a third transmission frequency resource supported by a second communication device; and the second determining sub-module is further configured to:

select an overlapped portion between the second transmission frequency resource and the third transmission frequency resource as the first transmission frequency resource.

Optionally, the second determining sub-module is further configured to:

select, from the second transmission frequency resource according to a current first transmission scheme, a first transmission frequency resource that includes a carrier corresponding to the first transmission scheme; or determine a second transmission scheme based on the second transmission frequency resource, and use, as the first transmission frequency resource, a transmission frequency resource that includes a carrier corresponding to the second transmission scheme.

Optionally, the second determining sub-module is further configured to:

select, from the second transmission frequency resource based on the channel measurement information, a first transmission frequency resource that meets a first preset condition, where the first preset condition is that a measurement parameter belongs to a corresponding first value range.

Optionally, the determining module further includes:

a processing sub-module, configured to select, based on the channel measurement information, a fourth transmission frequency resource that meets a second preset condition; and a third determining sub-module, configured to determine the first transmission frequency resource based on the fourth transmission frequency resource, where the second preset condition is that a measurement parameter belongs to a corresponding second value range.

Optionally, the third determining sub-module is further configured to:

use the fourth transmission frequency resource as the first transmission frequency resource.

Optionally, the third determining sub-module is further configured to:

select, from the fourth transmission frequency resource according to a current third transmission scheme, a first transmission frequency resource that includes a carrier corresponding to the third transmission scheme; or determine a fourth transmission scheme based on the fourth transmission frequency resource, and use, as the first transmission frequency resource, a transmission frequency resource that includes a carrier corresponding to the fourth transmission scheme.

Optionally, the apparatus further includes:

a sending module, configured to send transmission configuring information, where the transmission configuring information includes at least one of:

information about the first transmission frequency resource; or monitoring start indication information, where the monitoring start indication information is used to indicate that a second communication device starts monitoring on the first transmission frequency resource, and receives information from a first communication device.

Optionally, the apparatus further includes:

a transmission module, configured to perform transmission based on the first transmission frequency resource.

Optionally, the obtaining sub-module is further configured to:

receive the third transmission frequency resource sent by the second communication device.

Optionally, the channel measurement information is obtained from measurement performed by a second communication device based on a measurement signal sent by a first communication device; or the channel measurement information is obtained from measurement performed by the first communication device based on a measurement signal sent by the second communication device.

According to the apparatus, at least one of an environmental factor or channel measurement information is obtained, and a first transmission frequency resource used for subsequent transmission may be determined based on the at least one of the environmental factor or the channel measurement information. Because the first transmission frequency resource is determined in consideration of influence of an environment and/or a channel, the first transmission frequency resource not only has availability, but also can achieve better transmission.

The apparatus for determining a transmission frequency in this embodiment of this application may be an apparatus, or may be a component, an integrated circuit, or a chip in a communication device. If the apparatus is user equipment. The user equipment may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in the embodiments of this application. Certainly, the apparatus may alternatively be a network side device.

The apparatus for determining a transmission frequency provided in this embodiment of this application can implement each process implemented by the first communication device in the method embodiment in FIG. 2. To avoid repetition, details are not described herein again.

Figure 5:
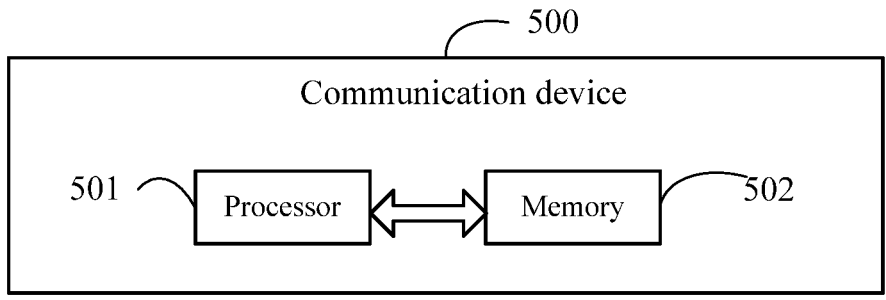
FIG. 5 is a structural diagram of a communication device according to an embodiment of this application.

Optionally, as shown in FIG. 5, an embodiment of this application further provides a communication device, including a processor 501, a memory 502, and a program or instructions stored in the memory 502 and executable on the processor 501. The communication device 500 may be user equipment, or may be a network side device. When the program or instructions are executed by the processor 501, the processes of the foregoing embodiments of the method for determining a transmission frequency are implemented, with the same technical effects achieved. To avoid repetition, details are not described herein again.

Figure 6:
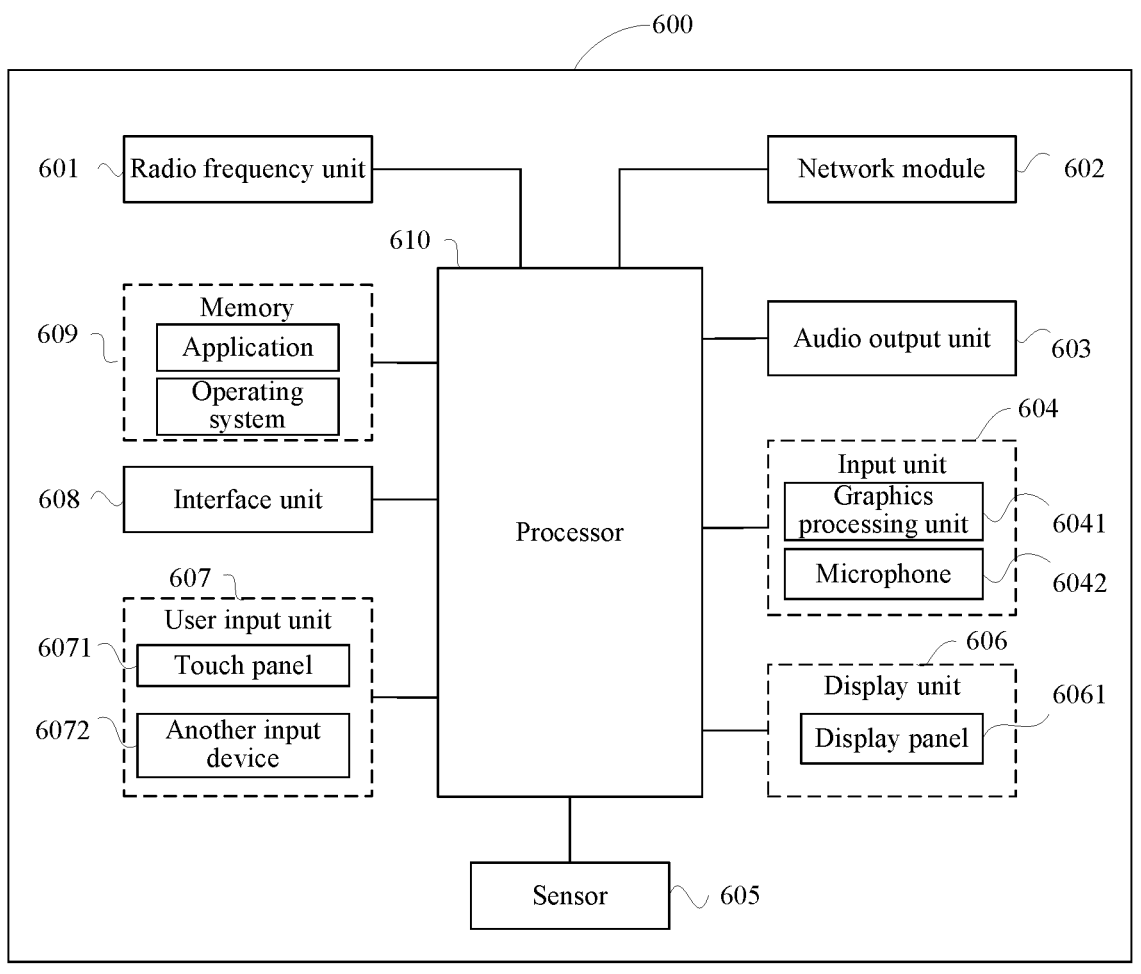
FIG. 6 is a structural diagram of a terminal according to an embodiment of this application.

FIG. 6 is a schematic diagram of a hardware structure of a terminal for implementing the embodiments of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the terminal 600 may further include a power supply (such as a battery) that supplies power to each component. The power supply may be logically connected to the processor 610 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that, in the embodiments of this application, the input unit 604 may include a graphics processing unit (GPU) 6041 and a microphone 6042, and the graphics processing unit 6041 processes image data of a still picture or video obtained by an image capture apparatus (such as a camera) in a video capture mode or an image capture mode. The display unit 606 may include a display panel 6061, and the display panel 6061 may be configured in a form of a liquid crystal display, an organic light emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, or the like.

The memory 609 may be configured to store a software program or an instruction and various pieces of data. The memory 609 may mainly include a program or instruction storage area and a data storage area. The program or instruction storage area may store an operating system, and an application program or an instruction required by at least one function (for example, a sound playing function or an image playing function). In addition, the memory 609 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 610 may include one or more processing units. Optionally, an application processor and a modem processor may be integrated into the processor 610. The application processor mainly processes an operating system, a user interface, an application, an instruction, or the like. The modem processor mainly processes wireless communications, for example, a baseband processor. It can be understood that, alternatively, the modem processor may not be integrated into the processor 610.

The processor 610 is configured to: obtain at least one of an environmental factor or channel measurement information; and determine a first transmission frequency resource based on the at least one of the environmental factor or the channel measurement information.

According to the terminal, at least one of an environmental factor or channel measurement information is obtained, and a first transmission frequency resource used for subsequent transmission may be determined based on the at least one of the environmental factor or the channel measurement information. Because the first transmission frequency resource is determined in consideration of influence of an environment and/or a channel, the first transmission frequency resource not only has availability, but also can achieve better transmission.

Figure 7:
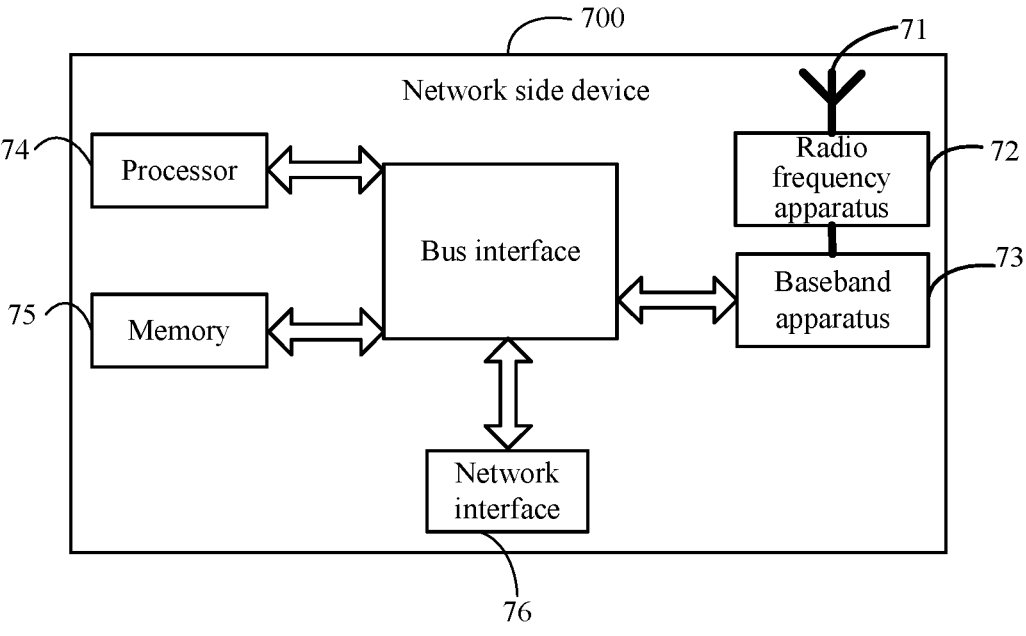
FIG. 7 is a structural diagram of a network side device according to an embodiment of this application.

For example, an embodiment of this application further provides a network side device. As shown in FIG. 7, the network side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes information to be sent and sends the information to the radio frequency apparatus 72, and the radio frequency apparatus 72 processes the received information and sends the information through the antenna 71.

The band processing apparatus may be located in the baseband apparatus 73. The method performed by the first communication device in the foregoing embodiment may be implemented in the baseband apparatus 73. The baseband apparatus 73 includes a processor 74 and a memory 75.

The baseband apparatus 73 may include, for example, at least one baseband board. A plurality of chips are disposed on the baseband board. As shown in FIG. 7, one of the chips is, for example, the processor 74, which is connected to the memory 75 to invoke a program in the memory 75, so as to perform the operations of the network device shown in the foregoing method embodiments.

The baseband apparatus 73 may further include a network interface 76, configured to exchange information with the radio frequency apparatus 72. For example, the interface is a common public radio interface (CPRI).

For example, the network side device in this embodiment of this application further includes an instruction or a program stored in the memory 75 and executable on the processor 74. The processor 74 invokes the instruction or the program in the memory 75 to perform the method performed by the modules shown in FIG. 7, and a same technical effect is achieved. To avoid repetition, details are not described herein again.

An embodiment of this application further provides a non-transitory computer-readable storage medium. The non-transitory computer-readable storage medium stores a program or instructions. When the program or instructions are executed by a processor, the processes of the foregoing embodiments of the method for determining a transmission frequency are implemented, with the same technical effects achieved. To avoid repetition, details are not described herein again.

The processor is a processor in the electronic device in the foregoing embodiment. The non-transitory computer-readable storage medium includes a computer read-only memory (ROM), a random access memory (RAM), a magnetic disk, an optical disc, or the like.

An embodiment of this application further provides a chip. The chip includes a processor and a communication interface. The communication interface is coupled to the processor. The processor is configured to execute a program or instructions to implement the processes of the foregoing embodiments of the method for determining a transmission frequency, with the same technical effects achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product is stored in a non-volatile storage medium. The computer program product is executed by at least one processor to implement the processes of the foregoing embodiments of the method for determining a transmission frequency, with the same technical effects achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above with reference to the accompanying drawings, but this application is not limited to the foregoing implementations. The foregoing implementations are merely illustrative instead of restrictive. Under the enlightenment of this application, a person of ordinary skill in the art may make many forms without departing from the essence of this application and the protection scope of claims, all of which fall within the protection of this application.

What is claimed is:

1. A method for determining a transmission frequency, performed by a first communication device and comprising:
   obtaining an environmental factor; and
   determining, according to a mapping relationship between frequency resources and environmental factors, a second transmission frequency resource corresponding to the environmental factor;
   obtaining a third transmission frequency resource supported by a second communication device, and selecting an overlapped portion between the second transmission frequency resource and the third transmission frequency resource as a first transmission frequency resource; or
   selecting, from the second transmission frequency resource according to a current first transmission scheme, the first transmission frequency resource that comprises a carrier corresponding to the first transmission scheme; or
   determining a second transmission scheme based on the second transmission frequency resource, and using, as the first transmission frequency resource, a transmission frequency resource that comprises a carrier corresponding to the second transmission scheme; wherein
   the first transmission frequency resource is used for transmission.

2. The method according to claim 1, wherein the environmental factor comprises at least one of:
   a transmission distance;
   an air humidity;
   an oxygen concentration;
   a temperature; or
   a barometric pressure.

3. The method according to claim 1, wherein the determining a first transmission frequency resource based on the at least one of the environmental factor or the channel measurement information comprises:
   determining the first transmission frequency resource based on the second transmission frequency resource.

4. The method according to claim 3, wherein the determining the first transmission frequency resource based on the second transmission frequency resource comprises:
   using the second transmission frequency resource as the first transmission frequency resource.

5. The method according to claim 3, wherein the determining the first transmission frequency resource based on the second transmission frequency resource comprises:
   selecting, from the second transmission frequency resource based on the channel measurement information, a first transmission frequency resource that meets a first preset condition; wherein the first preset condition is that a measurement parameter belongs to a corresponding first value range.

6. The method according to claim 1, wherein the determining a first transmission frequency resource based on the channel measurement information comprises:

selecting, based on the channel measurement information, a fourth transmission frequency resource that meets a second preset condition; and determining the first transmission frequency resource based on the fourth transmission frequency resource; wherein the second preset condition is that a measurement parameter belongs to a corresponding second value range.

7. The method according to claim 6, wherein the determining the first transmission frequency resource based on the fourth transmission frequency resource comprises:

using the fourth transmission frequency resource as the first transmission frequency resource; or selecting, from the fourth transmission frequency resource according to a current third transmission scheme, a first transmission frequency resource that comprises a carrier corresponding to the third transmission scheme; or determining a fourth transmission scheme based on the fourth transmission frequency resource, and using, as the first transmission frequency resource, a transmission frequency resource that comprises a carrier corresponding to the fourth transmission scheme.

8. The method according to claim 1, after the determining a first transmission frequency resource, further comprising:

sending transmission configuring information, wherein the transmission configuring information comprises at least one of:

information about the first transmission frequency resource; or monitoring start indication information, wherein the monitoring start indication information is used to indicate that a second communication device starts monitoring on the first transmission frequency resource, and receives information from the first communication device.

9. The method according to claim 1, after the determining a first transmission frequency resource, further comprising:

performing transmission based on the first transmission frequency resource.

10. The method according to claim 1, wherein the obtaining a third transmission frequency resource supported by a second communication device comprises:

receiving the third transmission frequency resource sent by the second communication device.

11. The method according to claim 1, wherein the channel measurement information is obtained from measurement performed by a second communication device based on a measurement signal sent by the first communication device; or the channel measurement information is obtained from measurement performed by the first communication device based on a measurement signal sent by the second communication device.

12. A communication device, comprising a processor, a memory, and a program or instructions stored in the memory and executable on the processor, wherein the program or instructions, when executed by the processor, cause the communication device to perform:

obtaining an environmental factor;

determining, according to a mapping relationship between frequency resources and environmental factors, a second transmission frequency resource corresponding to the environmental factor;

obtaining a third transmission frequency resource supported by a second communication device, and selecting an overlapped portion between the second transmission frequency resource and the third transmission frequency resource as a first transmission frequency resource; or selecting, from the second transmission frequency resource according to a current first transmission scheme, the first transmission frequency resource that comprises a carrier corresponding to the first transmission scheme; or determining a second transmission scheme based on the second transmission frequency resource, and using, as the first transmission frequency resource, a transmission frequency resource that comprises a carrier corresponding to the second transmission scheme; wherein the first transmission frequency resource is used for transmission.

13. The communication device according to claim 12, wherein the program or instructions, when executed by the processor, cause the communication device to perform:

determining the first transmission frequency resource based on the second transmission frequency resource.

14. The communication device according to claim 13, wherein the program or instructions, when executed by the processor, cause the communication device to perform:

using the second transmission frequency resource as the first transmission frequency resource.

15. The communication device according to claim 13, wherein the program or instructions, when executed by the processor, cause the communication device to perform:

selecting, from the second transmission frequency resource based on the channel measurement information, a first transmission frequency resource that meets a first preset condition; wherein the first preset condition is that a measurement parameter belongs to a corresponding first value range.

16. The communication device according to claim 12, wherein the program or instructions, when executed by the processor, cause the communication device to perform:

selecting, based on the channel measurement information, a fourth transmission frequency resource that meets a second preset condition; and determining the first transmission frequency resource based on the fourth transmission frequency resource; wherein the second preset condition is that a measurement parameter belongs to a corresponding second value range.

17. A non-transitory computer-readable storage medium, wherein the non-transitory computer-readable storage medium stores a program or instructions, and the program or instructions, when executed by a processor, cause the processor to perform:

obtaining an environmental factor;

determining, according to a mapping relationship between frequency resources and environmental factors, a second transmission frequency resource corresponding to the environmental factor;

obtaining a third transmission frequency resource supported by a second communication device, and selecting an overlapped portion between the second transmission frequency resource and the third transmission frequency resource as a first transmission frequency resource; or selecting, from the second transmission frequency resource according to a current first transmission scheme, the first transmission frequency resource that comprises a carrier corresponding to the first transmission scheme; or determining a second transmission scheme based on the second transmission frequency resource, and using, as the first transmission frequency resource, a transmission frequency resource that comprises a carrier corresponding to the second transmission scheme; wherein the first transmission frequency resource is used for transmission.

\* \* \* \* \*